July 14, 1970  P. C. RIEGGER  3,520,748
METHODS AND ARRANGEMENTS FOR TRANSVERSELY CUTTING TRAVELLING
WEBS OF PAPER OR FOIL OR FILMS OF PLASTICS
AND OTHER FLEXIBLE MATERIALS
Filed Oct. 5, 1966  3 Sheets-Sheet 1
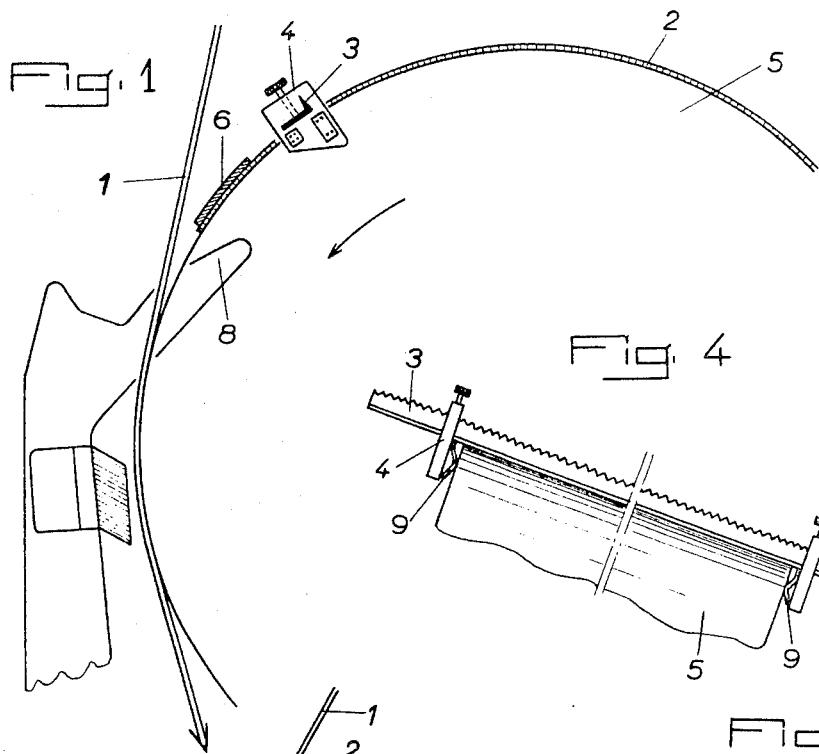
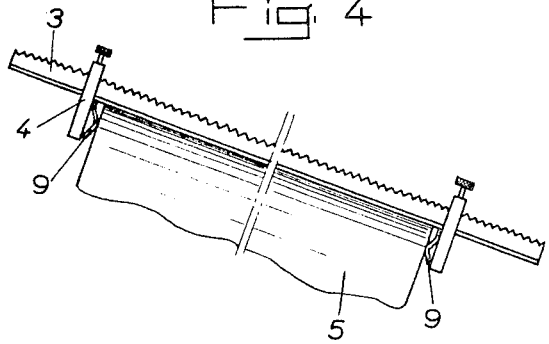
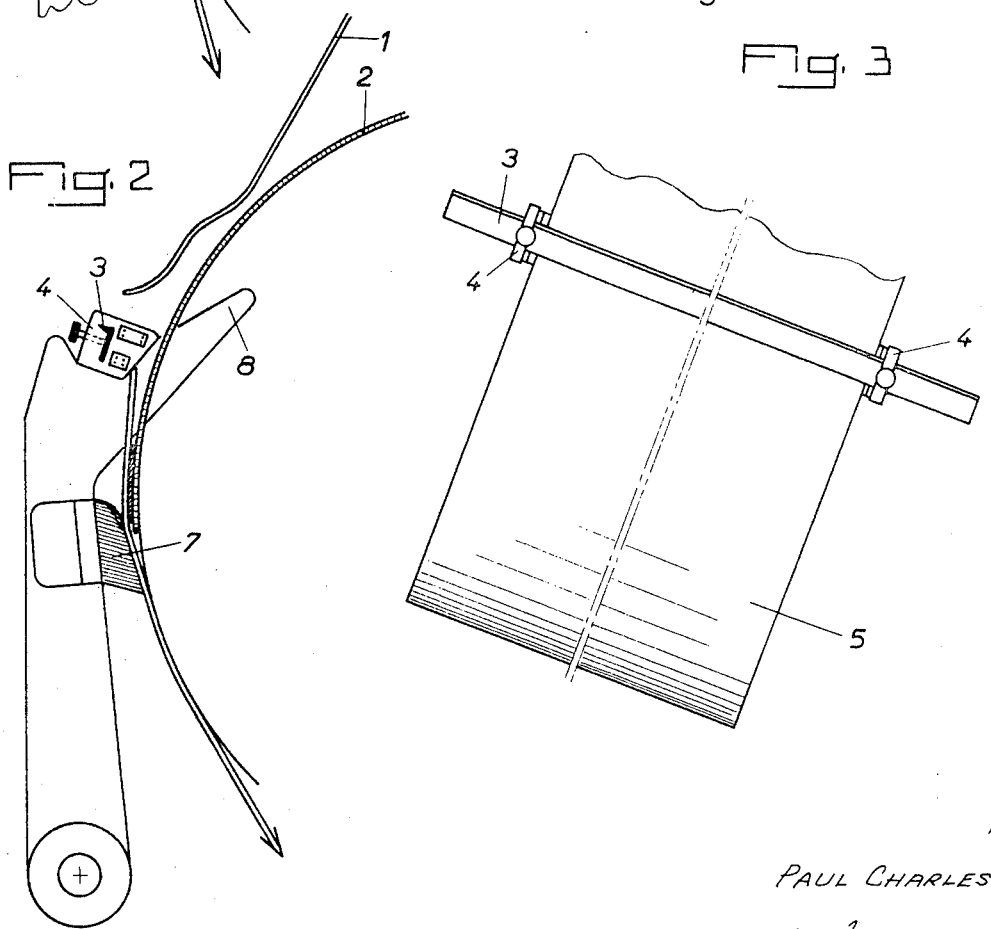
INVENTOR
PAUL CHARLES RIEGGER
By Young + Thompson
ATTYS.

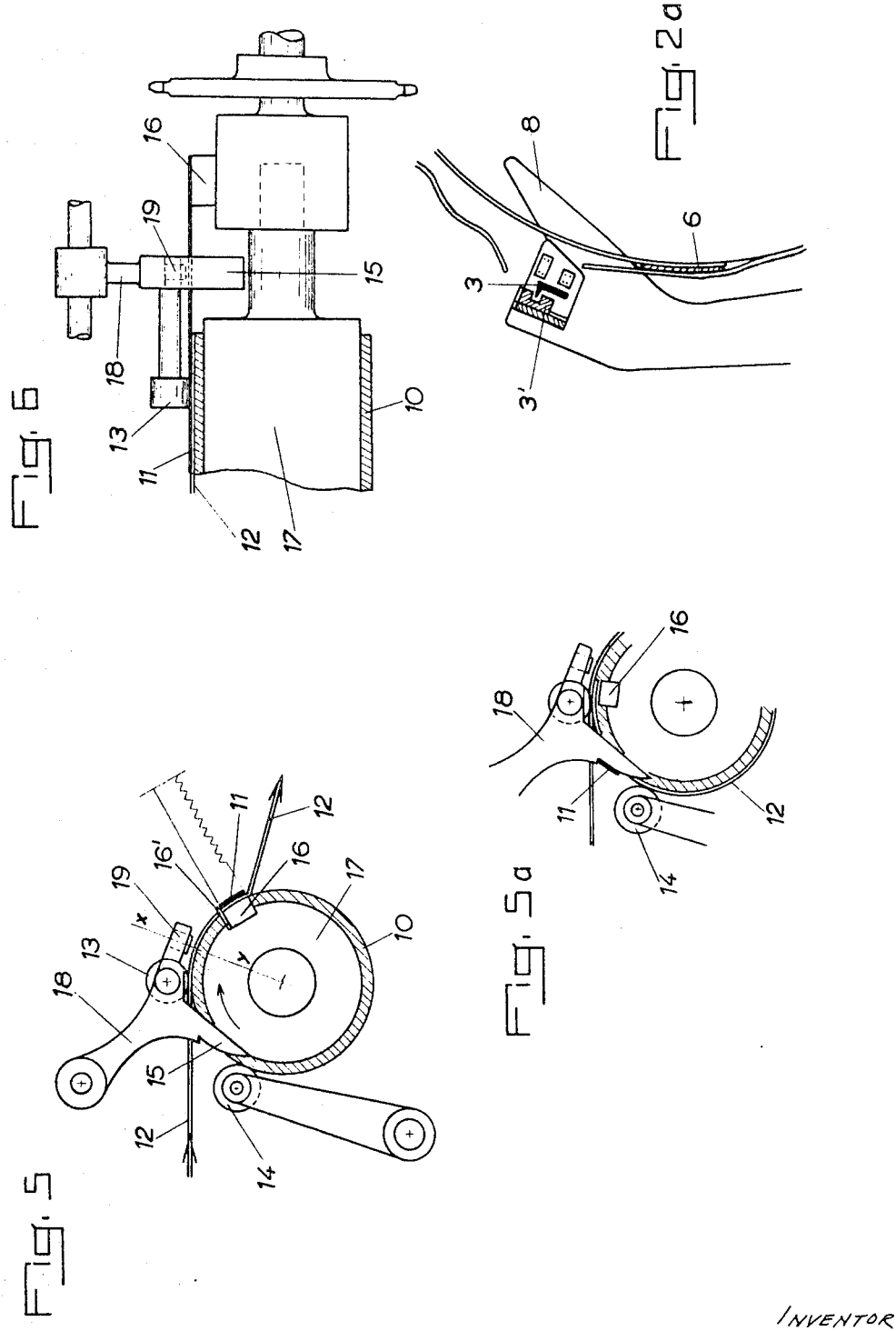

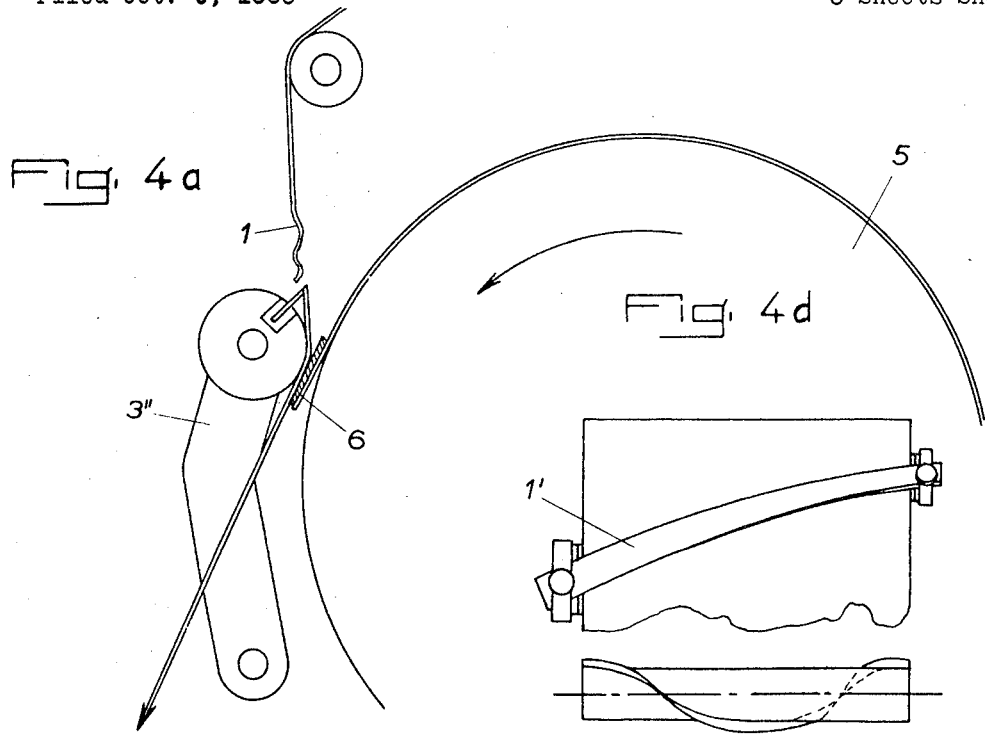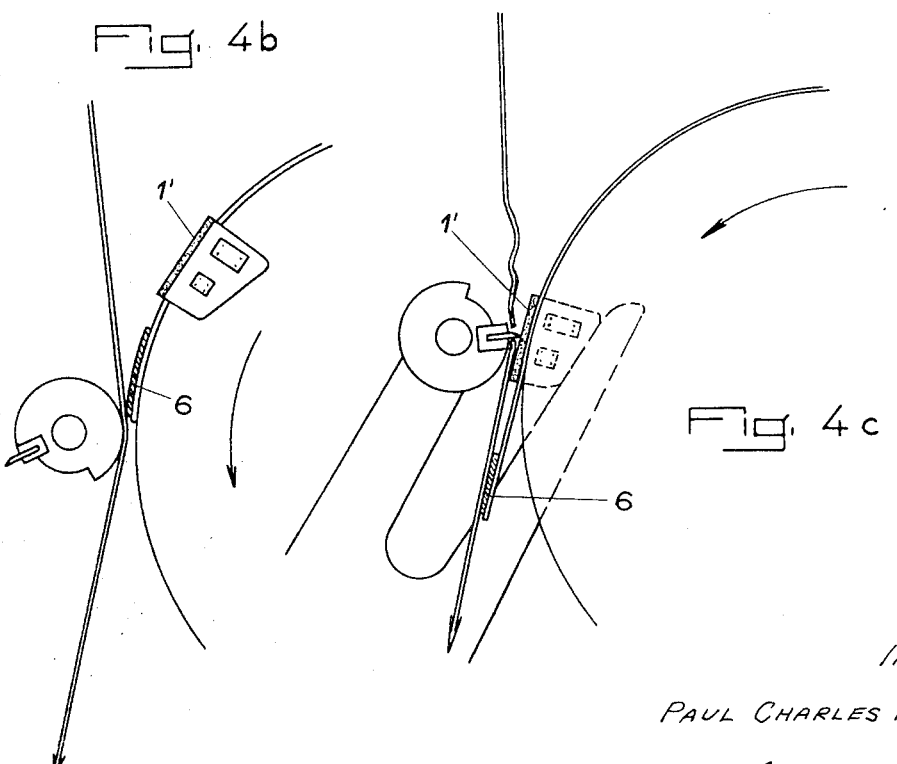

United States Patent Office 3,520,748
Patented July 14, 1970

3,520,748
METHODS AND ARRANGEMENTS FOR TRANS-
VERSELY CUTTING TRAVELLING WEBS OF
PAPER OR FOIL OR FILMS OF PLASTICS AND
OTHER FLEXIBLE MATERIALS
Paul Charles Riegger, 7 Rue Ehrmann,
Strasbourg, Bas-Rhin, France
Filed Oct. 5, 1966, Ser. No. 584,472
Claims priority, application France, Oct. 7, 1965,
8,434
Int. Cl. B31f 5/00; G03d 15/04
U.S. Cl. 156—159
5 Claims

ABSTRACT OF THE DISCLOSURE

A web is attached to a roll so as to secure the trailing end of the web to the leading edge of a fresh web on the roll to be unwound from the roll, or so as to attach the trailing end of the web to a roll which comprises a mandrel to wind the web on the roll. To do this, a cutter is temporarily attached to the periphery of the roll and rotates with the roll, which is brought up to the peripheral speed of the web, whereupon the web is applied to the roll and then the cutter is detached from the roll and severs the trailing end of the web.

---

This invention relates to methods for transversely cutting travelling webs of paper or foil or films of plastics and other flexible materials and attaching the cut webs whilst in motion to other continuous webs or to the cores of rolls or the like, the travelling webs or the roll cores being driven by driving means of any suitable kind.

One object of the invention is to provide improved and more efficient methods, for attaching the cut ends of travelling webs to rotating rolls or roll cores.

The methods of cutting travelling webs known hitherto utilise a cutter carried by a device which guides the cutter in a direction at least approximately perpendicular relative to the web and driving the cutter transversely to the web in order to sever the latter. This device is independent of the roll.

The disadvantages of these known methods arise mainly from the necessity of their functioning being synchronized precisely with other members. The corresponding devices are, therefore, bulky and expensive.

Accordingly the present invention has as a further object to alleviate the above mentioned disadvantages and moreover to allow operation with higher linear velocities of the webs.

According to one feature of the invention the desired advantages are obtained by attaching the cutter to the roll formed by one of two webs or to a cutter carrier guided in such a manner as to be able to accompany the periphery of the roll at least during the operation of severing the web. The cutter may also, however, be attached on the periphery of a tube when it is a matter of commencing the winding of a fresh roll.

The above mentioned aims and objects and further features of the invention appear from the following description and claims and the accompanying drawings.

The invention is illustrated diagrammatically and by way of example in the accompanying drawings, in which:

FIGS. 1 and 2 are detail views partially in cross-section illustrating a first method in accordance with the invention in two different stages of operation, FIG. 2a is a detail view showing some of the elements as in FIG. 2 but with a modification, FIGS. 3 and 4 are respectively a partial plan view and a detail elevation of some of the elements shown in FIGS. 1 and 2, FIG. 4a is a detail view partially in cross-section illustrating a further modification, FIGS. 4b and 4c are views corresponding to FIG. 4a but illustrating a still further modification in two different stages of operation, FIG. 4d is a detail view in plan illustrating the arrangement of a strip on a spool, FIGS. 5 and 5a are detail views partially in cross-section illustrating a still further modification, and FIG. 6 is a detail view partially in section in a plane at right-angles with respect to FIG. 5.

In the first example of putting the invention into practice the method can be employed in the severing of a continuously travelling web and its attachment to the leading portion of another web wound in the form of a roll, the peripheral speed of this roll being substantially synchronous with the linear speed of the first web. This first example of the employment of the new method is illustrated by FIGS. 1, 2, 2a, 3 and 4 of the accompanying drawings. These figures illustrate the case in which the cutter 3 or the cutter carrier is positioned upon the actual periphery of the roll 5 formed by the web 2 to which the web 1 must be joined, the two webs travelling forwards at substantially equal linear speeds.

The provisional attachment of the cutter 3 is obtained, for example, by a pair of cheeks 4 each provided with a leaf spring 9 slightly bent outwards on its surface turned towards the spool 5. These cheeks 4 are fixed on and near to each end of the cutter 3 in such a manner that the distance between the springs 9 is slightly less than the axial length of the roll 5 so that the springs abut with a suitable force against the flanks of the roll (see FIG. 4).

In order to interconnect the two webs 1 and 2 whilst travelling, it is necessary:

(a) To dispose the cutter 3 sufficiently rearward with respect to the leading portion of the web 2 of the roll 5 and to apply adhesive, for example glue or size 6, to the leading edge of the web 2 in roll 5, as seen in FIG. 1;

(b) To start the roll 5 into rotation until its peripheral speed is synchronised with the linear speed of the web 1, whilst moving the roll 5 toward the web 1 until the latter touches the brush 7;

(c) When the cheeks 4 carrying the cutter 3 reach an extractor 8 the cutter 3 will be progressively moved from the periphery of the roll 5 by the two ramps of this extractor 8, which causes the penetration of he teeth of the serrated cutter 3 into the web 1;

(d) The sudden immobilization of the cutter 3 by the abutments at the ends of the ramps of the extractor 8 complete the severing of the web 1, which is pressed by a brush 7 or a roller against the web 2, which thus effects the joining of the two webs 1 and 2 (FIG. 2).

A bar 3' with a longitudinal channel slot (FIG. 2a) may be mounted near the ends of the ramps of the extractor 8 in such a way that it supports the web 1 against the pressure of the cutter 3 and thus facilitates the severance.

In the second example of putting the invention into practice, as exemplified in FIGS. 4a and 4d there is likewise effected the method for the cutting of an exhausted unwinding web, the cutting device being however mounted upon a rotary cutter carrier supported by a pair of arms. To suit the resistance of the material of the web this cutting device may act alone or with the assistance of a counter member.

FIG. 4a illustrates the case where the cutter acts alone without a counter member. The cutter is inserted in a body of which a cylindrical part is arranged for supporting the finishing web 1 against the adhesive-carrying starting portion of the fresh web on the roll 5 to be connected. The roll 5 being started into rotation as in the previous instance, the support levers 3" for the cutter carrier body bring the latter into contact under pressure through the intermediary of the web 1 with the roll 5 slightly before the passage of the adhesive 6 on the leading edge. The roll 5, thus started in rotation, causes rotation of the cutter carrier up to the moment when the cutter severs the web 1, after which the levers 3" again remove the cutter carrier.

The device illustrated by FIGS. 4b, 4c and 4d utilizes a cutter carrier like that in the device of FIG. 4a, but in addition a strip 1' with a resilient surface orientated transversely or obliquely with respect to the direction of unwinding of the web is attached, for example, on the periphery of the roll 5 in a manner similar to that employed for the cutter 3 as illustrated in FIGS. 1, 3 and 4. This attachment of the strip 1' is effected at a distance from the leading edge of the web of the roll 5 such that after the starting into rotation of the roll 5 and abutment of the cutter carrier as in FIG. 4a the cutter touches the web 1 at the place where the latter is supported by the counter member strip 1' and thus the web 1 is severed.

The removal of this counter member strip 1' is then effected like the removal of the cutter as illustrated in FIG. 2.

In a further example of the employment of the method the severance of the web may be followed by the attachment of this web to a mandrel tube on which the web is to be wound in order to form a roll, the spindle on which the mandrel tube is mounted being driven for example by a chain and sprocket or other suitable means.

A device embodying this modification is illustrated in FIGS. 5 and 5a and 6. A travelling web 12 is entrained around a mandrel tube 10 by a cutter 11, which is preferably serrated. For this purpose the cutter 11 is placed upon the web 12 by a pivotal movement of two levers 18 which hold the cutter 11 by two weak magnetic holders 19. At the moment when two strong magnetic holders 16, which rotate with the tube 10 and carry projections 16', pass the line x–y these strong magnetic holders 16 attract the ends of the cutter towards the periphery of the tube 10 and in this way apply the cutter to the web 12.

From this moment onward the cutter 11 entrains and deflects the web 12 in a direction different from that in which the web is normally pulled until the moment when the web is severed by the serrated edge of the cutter 11.

Rollers 13 are mounted on the two levers 18 and press the web 12 against the tube 10, contributing to the entrainment of the web 12 of which the leading portion continues to be maintained by the cutter 11 on the tube 10 up to the moment when the said cutter 11 is removed from the tube 10 and arrested by a pair of ramps 15 (FIGS. 5 and 6).

Rollers 14 pressing on the tube 10 engage and ensure the forwarding of the leading portion of the web 12 up to the point where the latter has completely surrounded the tube 10 and where the entraining is again taken over by the rollers 13.

It goes without saying that many modifications of detail may be introduced without departing from the invention. For example the cutter or cutter carrier could be mounted upon a roller or upon a chain conveyor or on intermediate rollers between the roll or roll core and the web to be severed.

I claim:

1. A method for the transverse severance of a travelling continuous web and for its attachment to a roll, comprising temporarily securing to the roll a cutter that rotates with the roll and rotating the roll at a peripheral speed substantially equal to the linear speed of the web, applying the web to the roll, severing the web by means of the cutter, and detaching the cutter from the roll.

2. A method as claimed in claim 1, in which said roll constitutes a second web having a free leading end on the outer surface of the roll, said applying of the first-mentioned web to the roll comprising a securement of the first-mentioned web to the outer surface of said leading end of said second web with severance of only said first-mentioned web so that the severed end of the first-mentioned web is secured to the exposed end of the second web after which the second web unrolls from the roll continuously in series with the first-mentioned web.

3. A method as claimed in claim 1, in which said roll is in the form of a mandrel on which said web rolls up after severance.

4. A method as claimed in claim 1, and removing said cutter from said roll by deflecting the cutter from the path of the periphery of the roll and arresting the movement of the cutter.

5. A method as claimed in claim 1, in which the cutter is secured to the roll with a sliding frictional grip.

References Cited

UNITED STATES PATENTS

| 2,320,658 | 6/1943 | Roesen | 242—58.1 |
| 2,082,400 | 6/1937 | Jordhoy | 242—58.1 |
| 3,309,035 | 3/1967 | Degutis | 242—58.1 |

DOUGLAS J. DRUMMOND, Primary Examiner

U.S. Cl. X.R.
156—504; 242—58.4